United States Patent
Li et al.

(10) Patent No.: US 12,493,487 B2
(45) Date of Patent: Dec. 9, 2025

(54) METHOD AND APPARATUS FOR SCHEDULING SERVICE, ELECTRONIC DEVICE, AND STORAGE MEDIUM

(71) Applicants: Gree Electric Appliances, Inc. of Zhuhai, Guangdong (CN); Zhuhai Leayun Technology Co., Ltd, Zhuhai (CN)

(72) Inventors: Mingjie Li, Guangdong (CN); Dechao Song, Guangdong (CN); Jutao Jia, Guangdong (CN); Wei Wu, Guangdong (CN); Tianyun Hu, Guangdong (CN)

(73) Assignees: Gree Electric Appliances, Inc. of Zhuhai, Zhuhai (CN); Zhunai Leayun Technology Co., Ltd, Zhuhai (CN)

( * ) Notice: Subject to any disclaimer, the term of this patent is extended or adjusted under 35 U.S.C. 154(b) by 693 days.

(21) Appl. No.: 17/793,567

(22) PCT Filed: Nov. 2, 2020

(86) PCT No.: PCT/CN2020/125932
§ 371 (c)(1),
(2) Date: Jul. 18, 2022

(87) PCT Pub. No.: WO2021/143287
PCT Pub. Date: Jul. 22, 2021

(65) Prior Publication Data
US 2023/0063202 A1    Mar. 2, 2023

(30) Foreign Application Priority Data
Jan. 16, 2020   (CN) .......................... 202010048710.7

(51) Int. Cl.
*G06F 9/48*   (2006.01)
(52) U.S. Cl.
CPC ................................ *G06F 9/4881* (2013.01)

(58) Field of Classification Search
None
See application file for complete search history.

(56) References Cited

U.S. PATENT DOCUMENTS

2005/0283782 A1   12/2005   Lu et al.
2008/0281904 A1   11/2008   Conrad et al.
(Continued)

FOREIGN PATENT DOCUMENTS

| CN | 105589945 A | 5/2016 |
|---|---|---|
| CN | 106027344 A | 10/2016 |

(Continued)

OTHER PUBLICATIONS

International Search Report, with a mailing date of Feb. 4, 2021, in International application No. PCT/CN2020/125932, filed on Nov. 2, 2020.

(Continued)

*Primary Examiner* — Eric C Wai
(74) *Attorney, Agent, or Firm* — MCANDREWS, HELD & MALLOY, LTD.

(57) ABSTRACT

Embodiments of the present disclosure provide a method and an apparatus for scheduling a service, an electronic device, and a storage medium. The method includes: a service scheduling task is acquired, the service scheduling task is composed of a first identifier corresponding to a service request, and a second identifier corresponding to a device receiving the service request; a third identifier corresponding to a service associated with the service scheduling task is searched in a preset service scheduling knowledge graph; at least one service scheduling sequence is generated on the basis of the service scheduling task and the third identifier corresponding to the service; a target service scheduling sequence is determined from the at least one service scheduling sequence; and the device is notified to (Continued)

access a service corresponding to the third identifier in the target service scheduling sequence.

7 Claims, 4 Drawing Sheets

(56) References Cited

U.S. PATENT DOCUMENTS

| | | |
|---|---|---|
| 2010/0195558 A1 | 8/2010 | Koskinen |
| 2019/0220321 A1 | 7/2019 | Yang |

FOREIGN PATENT DOCUMENTS

| | | |
|---|---|---|
| CN | 106572187 A | 4/2017 |
| CN | 107168788 A | 9/2017 |
| CN | 109375992 A | 2/2019 |
| CN | 109857551 A | 6/2019 |
| CN | 109995817 A | 7/2019 |
| CN | 110661879 A | 1/2020 |
| CN | 111274012 A | 6/2020 |

OTHER PUBLICATIONS

Research Report on Financial Technology Achievements (2018) (2 pages).
Binbin, Zhou, "Research on resource scheduling and load balancing based on cloud computing," Southwest Jiaotong University Master Degree Thesis, May 16, 2018 (69 pages).
OA1 search report-issued on Dec. 21, 2021, for Chinese application No. 2020100487107 (3 pages).
OA2 search report-issued on Mar. 15, 2022, for Chinese application No. 2020100487107 (2 pages).
Grant search report-issued on Jun. 8, 2022, for Chinese application No. 2020100487107 (2 pages).
The extended European search report for Application No. 20914465.8, dated Jun. 6, 2022, European Patent Office, Germany (13 pages).

METHOD AND APPARATUS FOR SCHEDULING SERVICE, ELECTRONIC DEVICE, AND STORAGE MEDIUM

RELATED APPLICATIONS

This application is a 371 of International Patent Application No. PCT/CN2020/125932, filed Nov. 2, 2020, which claims benefit of Chinese Patent Application No. CN 202010048710.7, filed to the China Patent Office on Jan. 16, 2020, entitled "Service Scheduling Method and Apparatus, Electronic Device, and Storage Medium," contents of both of which are hereby incorporated by reference in their entireties.

TECHNICAL FIELD

The present disclosure relates to the technical field of smart home, and in particular, to a method and an apparatus for scheduling a service, an electronic device, and a storage medium.

BACKGROUND

Smart home (home automation) takes residences as a platform, and integrates facilities related to home life by using a comprehensive wiring technology, a network communication technology, a security technology, an automatic control technology, and an audio/video technology, thereby constructing an efficient management system for residential facilities and family schedules, improving home security, convenience, comfort, and artistry, and implementing environmentally friendly and energy-saving living environments. With the increasing number of Internet of Things devices and services in a smart home system, the optimal scheduling among various services is getting more and more significant and needs to be resolved urgently.

In the methods known to the inventors, scheduling only by setting constant rules cannot achieve the optimization of service allocation, so that high-quality services and experience cannot be provided for users. For example, in a case that there are a plurality of music services, by only setting the constant rules for scheduling, a music air conditioner has fixed access to a single music service. When the music service is down or reaches the maximum number of visits, the music air conditioner cannot access, so that the music services cannot be provided for the users.

SUMMARY

Embodiments of the present disclosure provide a service scheduling method and apparatus, an electronic device, and a storage medium. A specific technical solution includes as follows.

A first aspect of some embodiments of the present disclosure first provides a service scheduling method. The method includes the following operations.

A service scheduling task is acquired, and the service scheduling task is composed of a first identifier corresponding to a service request and a second identifier corresponding to a device receiving the service request.

A third identifier corresponding to a service associated with the service scheduling task is searched in a preset service scheduling knowledge graph.

At least one service scheduling sequence is generated based on the service scheduling task and the third identifier corresponding to the service.

A target service scheduling sequence is determined from the at least one service scheduling sequence.

The device is notified to access a service corresponding to the third identifier in the target service scheduling sequence.

In an optional implementation, the target service scheduling sequence is determined from the at least one service scheduling sequence, includes the following operations.

A scheduling value corresponding to the at least one service scheduling sequence is calculated.

The target service scheduling sequence is determined from the at least one service scheduling sequence based on the scheduling value.

In an optional implementation, the scheduling value corresponding to the at least one service scheduling sequence is calculated, includes the following operations.

An importance degree of the service request corresponding to the first identifier, a utilization rate of the device corresponding to the second identifier, and an occupancy of the service corresponding to the third identifier in the at least one service scheduling sequence are acquired.

The importance degree, the utilization rate, and the occupancy are inputted into a scheduling value calculation model which is preset, to cause the scheduling value calculation model to output the scheduling value.

In an optional implementation, the scheduling value calculation model includes:

$$DV = I*A + F*B + U*C;$$

DV is the scheduling value, I is the importance degree, F is the utilization rate, U is the occupancy, A is a weight corresponding to the importance degree, B is a weight corresponding to the utilization rate, and C is a weight corresponding to the occupancy.

In an optional implementation, the target service scheduling sequence is determined from the at least one service scheduling sequence based on the scheduling value, includes the following operations.

A difference value between the scheduling value and a preset scheduling value threshold is calculated.

The target service scheduling sequence is determined from the at least one service scheduling sequence based on the difference value.

In an optional implementation, the target service scheduling sequence is determined from the at least one service scheduling sequence based on the difference value, includes the following operation.

A service scheduling sequence corresponding to a minimum difference value is determined as the target service scheduling sequence from the at least one service scheduling sequence.

In an optional implementation, the service scheduling task is acquired, includes the following operation.

The service scheduling task is acquired from a service scheduling task set based on a generation moment of the service scheduling task.

A second aspect of some embodiments of the present disclosure further provides an apparatus for service scheduling. The apparatus includes a task acquisition module, an identifier searching module, a sequence generation module, a sequence determination module, and a device notification module.

The task acquisition module is configured to obtain a service scheduling task, and the service scheduling task is composed of a first identifier corresponding to a service request and a second identifier corresponding to a device receiving the service request.

The identifier searching module is configured to search for a third identifier corresponding to a service associated with the service scheduling task in a preset service scheduling knowledge graph.

The sequence generation module is configured to generate at least one service scheduling sequence based on the service scheduling task and the third identifier corresponding to the service.

The sequence determination module is configured to determine a target service scheduling sequence from the at least one service scheduling sequence.

The device notification module is configured to notify the device to access a service corresponding to the third identifier in the target service scheduling sequence.

A third aspect of some embodiments of the present disclosure further provides an electronic device. The electronic device includes a processor, a communication interface, a memory, and a communication bus. The processor, the communication interface, and the memory communicate with each other by using the communication bus.

The memory is configured to store a computer program.

The processor is configured to implement the service scheduling method described in the first aspect when executing the program stored on the memory.

A fourth aspect of some embodiments of the present disclosure further provides a storage medium. The storage medium stores an instruction. When the instruction is operated on a computer, the computer executes the service scheduling method described in the first aspect.

A fifth aspect of some embodiments of the present disclosure further provides a computer program product including an instruction. When the computer program product is operated on a computer, the computer executes the service scheduling method described in the first aspect.

According to the technical solution provided in some embodiments of the present disclosure, the service scheduling task is obtained. The third identifier corresponding to the service associated with the service scheduling task is searched based on the service scheduling knowledge graph. The at least one service scheduling sequence is generated based on the service scheduling task and the third identifier corresponding to the service. The target service scheduling sequence is determined from the at least one service scheduling sequence. Therefore, the device is notified to access the service corresponding to the third identifier in the target service scheduling sequence. By determining a target service scheduling sequence from the at least one service scheduling sequence, and notifying the device to access the service corresponding to the third identifier in the target service scheduling sequence, the optimization of service allocation is realized, and the high-quality service and experience are provided for users.

BRIEF DESCRIPTION OF THE DRAWINGS

Drawings are incorporated into the specification and constitute a part of the specification. The drawings illustrate embodiments in accordance with the present disclosure and serve to understand the principles of the present disclosure together with the specification.

In order to more clearly illustrate the embodiments of the present disclosure or the technical solutions in the methods known to the inventors, the drawings used in the description of the embodiments or the methods known to the inventors will be briefly described below. It is apparent that other drawings are obtained from those skilled in the art according to these drawings without any creative work.

DETAILED DESCRIPTION OF THE EMBODIMENTS

In order to make objectives, technical solutions, and advantages of embodiments of the disclosure clearer, the technical solutions in the embodiments of the disclosure will be clearly and completely described below in combination with the drawings in the embodiments of the disclosure. It is apparent that the described embodiments are part of the embodiments of the disclosure, not all the embodiments. Based on the embodiments in the present disclosure, all other embodiments obtained by those of ordinary skilled in the art without creative work shall fall within the protection scope of the present disclosure.

Figure 1:
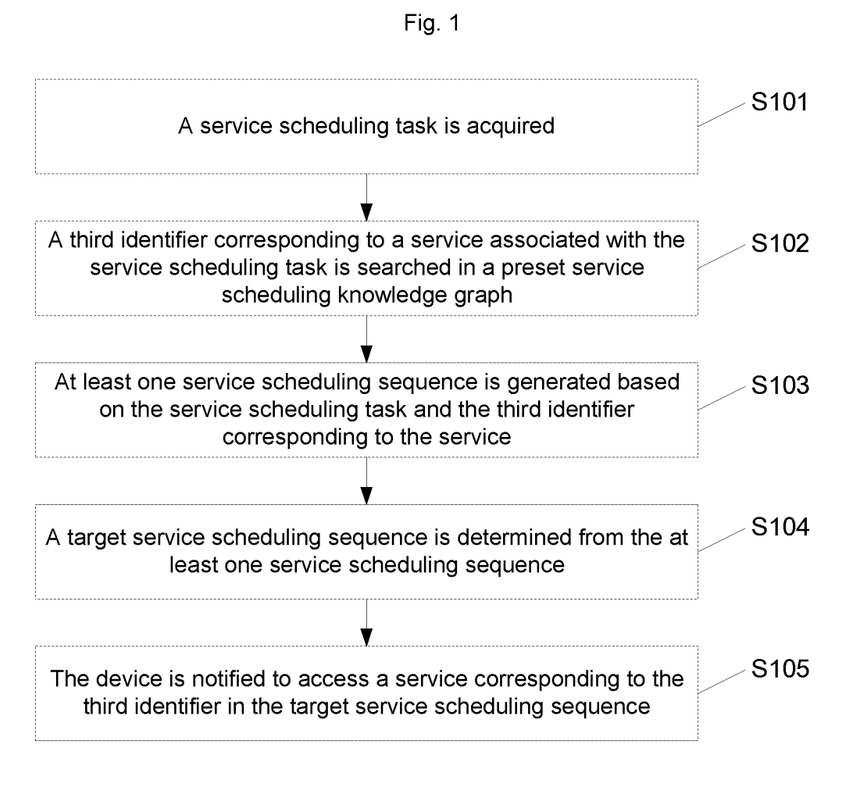
FIG. 1 is a schematic implementation flowchart of a service scheduling method according to some embodiments of the present disclosure.

FIG. 1 is a schematic implementation flowchart of a service scheduling method according to some embodiments of the present disclosure. The method specifically include the following steps.

At S101, a service scheduling task is acquired, and the service scheduling task is composed of a first identifier corresponding to a service request and a second identifier corresponding to a device receiving the service request.

In some embodiments of the present disclosure, when a user needs certain service, such as a music service, a service request is inputted into an Internet of Things device in a smart home system through voice or by using a remote control.

On the side of the Internet of Things device, the above service request is received, so that a corresponding service is accessed according to the service request, thereby providing the service to the user.

Therefore, for any Internet of Things device in the smart home system, the corresponding service request is received, as shown in a Table 1 below.

TABLE 1

| Service request | Internet of Things device |
| --- | --- |
| 1 | A |
| 2 | B |
| 3 | C |

Based on the above, a plurality of service scheduling tasks are generated, so that a service scheduling task set is formed. Any service scheduling task in the service scheduling task set consists of the first identifier corresponding to the service request, such as 1, 2, and 3 shown in Table 1, and the second identifier corresponding to the device receiving the service request, such as A, B, and C shown in Table 1.

For example, for the service scheduling task T generated in the service scheduling task set, the service scheduling task T consists of the first identifier 1 corresponding to the service request in Table 1 and the second identifier A corresponding to the device A receiving the service request 1.

In a service scheduling phase, in some embodiments of the present disclosure, the above service scheduling task is acquired from the service scheduling task set. The service scheduling task is processed, so as to perform a subsequent service scheduling strategy. The service scheduling task is expressed by a two-tuple, for example (service request 1, device A), which expresses that the device A receives the service request 1.

It is to be noted that, in some embodiments of the present disclosure, an identifier is an ID, or is a name, which is not limited thereto in some embodiments of the present disclosure.

At S102, a third identifier corresponding to a service associated with the service scheduling task is searched in a preset service scheduling knowledge graph.

Figure 2:
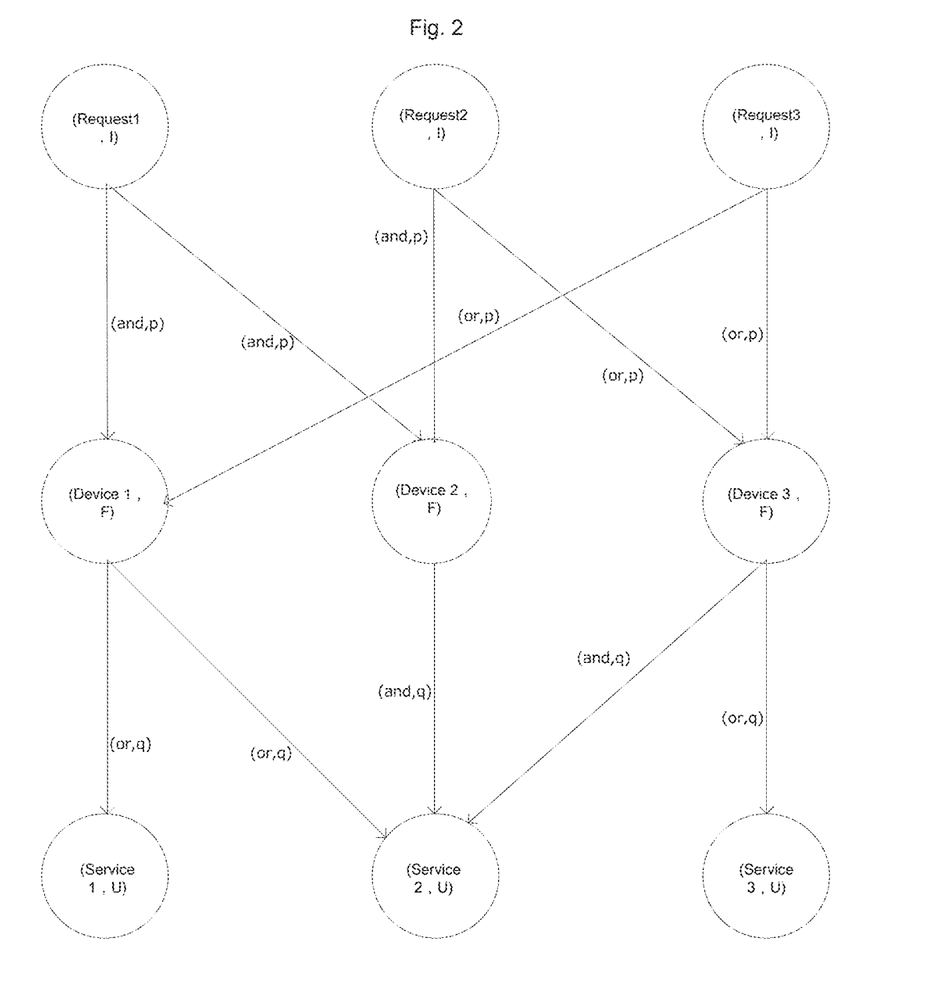
FIG. 2 is a schematic diagram of a service scheduling knowledge graph according to some embodiments of the present disclosure.

In some embodiments of the present disclosure, the service scheduling knowledge graph is pre-established according to an association relationship among the first identifier corresponding to the service request, the second identifier corresponding to the device, and the third identifier corresponding to the service. The service scheduling knowledge graph consists of nodes and sides.

The nodes in the service scheduling knowledge graph have 3 types, which are a request node, a device node, and a service node. The sides in the service scheduling knowledge graph have 2 types, which are "and" and "or". FIG. 2 is a schematic diagram of a service scheduling knowledge graph according to some embodiments of the present disclosure.

The request node consists of the first identifier corresponding to the service request and an importance degree I, for example (service request 1, I). The device node consists of the second identifier corresponding to the device and a utilization rate F, for example (device A, F). The service node consists of the third identifier corresponding to the service and an occupancy U, for example (service 1, U).

The side from the request to the device consists of logical calculation (and, or) and a weight p, for example, service request 1 (and, p) device A, device B, expressing that the processing of the service request 1 requires the device A and the device B, and the importance degree of the service request 1 is p. The side from the device to the service consists of logical calculation (and, or) and a weight q, for example, device A (or, q) service 1, service 2, expressing that the device A access the service 1 or the service 2, and the priority of the device is q.

Based on the above service scheduling knowledge graph, after the service scheduling task is acquired, since the service scheduling task is composed of the first identifier corresponding to the service request and the second identifier corresponding to the device receiving the service request, in some embodiments, the request node and the device node is determined in the above service scheduling knowledge graph, and then the third identifier, that is, the service node, corresponding to the service associated with the service scheduling task is searched in the above service scheduling knowledge graph.

For example, the service scheduling task is expressed by the two-tuple: (service request 1, device A (and) device B). The searching of the third identifier: 1 or 2, corresponding to the service associated with the service scheduling task in the service scheduling knowledge graph shown in FIG. 2 means that, in order to process the service request 1, the device A (and) device B access the service 1 or the service 2.

At S103, at least one service scheduling sequence is generated based on the service scheduling task and the third identifier corresponding to the service.

In some embodiments of the present disclosure, for the above service scheduling task and the third identifier corresponding to the service, at least one service scheduling sequence is generated. The service scheduling sequence is expressed by a three-tuple, for example, (service request 1, device A (and) device B, service 1 (or) service 2), which means that, in order to process the service request 1, the device A (and) device B access the service 1 or the service 2.

For example, in some embodiments of the present disclosure, the service scheduling task is expressed by the two-tuple: (service request 1, device A (and) device B), and the third identifier corresponding to the service is 1 or 2, so that the following two service scheduling sequences are generated based on the above service scheduling task and the third identifier corresponding to the service.

TABLE 2

| Service scheduling sequence | Composition of service scheduling sequence |
| --- | --- |
| 1 | Service request 1, device A (and) device B, service 1 |
| 2 | Service request 1, device A (and) device B, service 2 |

It is to be learned from Table 2 that, in some embodiments, the service scheduling sequence consists of the first identifier corresponding to the service request, the second identifier corresponding to the device receiving the service request, and the third identifier of the associated service, which is expressed as the three-tuple.

At S104, a target service scheduling sequence is determined from the at least one service scheduling sequence.

For the at least one generated service scheduling sequence, in some embodiments of the present disclosure, the target service scheduling sequence is determined from the at least one service scheduling sequence.

An optional implementation of determining the target service scheduling sequence, for example, is polled or random, which is not limited thereto in some embodiments of the present disclosure.

For example, for the above generated service scheduling sequence 1 and the service scheduling sequence 2, in some embodiments of the present disclosure, the service scheduling sequence 1 is determined as the target service scheduling sequence.

At S105, the device is notified to access a service corresponding to the third identifier in the target service scheduling sequence.

For the target service scheduling sequence determined in the above step, in some embodiments of the present disclosure, by notifying the device to access the service corresponding to the third identifier in the target service scheduling sequence, the optimization of service allocation is realized, and the high-quality service and experience are provided for users.

For example, for the above determined target service scheduling sequence (service scheduling sequence 1), the above device 1 is notified to access the service (service 1) corresponding to the third identifier in the target service scheduling sequence 1.

According to the above description of the technical solution provided in some embodiments of the present disclosure, the service scheduling task is acquired. The third identifier corresponding to the service associated with the service scheduling task is searched based on the service scheduling knowledge graph. The at least one service scheduling sequence is generated based on the service scheduling task and the third identifier corresponding to the service. The target service scheduling sequence is determined from the at least one service scheduling sequence. Therefore, the device is notified to access the service corresponding to the third identifier in the target service scheduling sequence. By determining a target service scheduling sequence from the at least one service scheduling sequence, and notifying the device to access the service corresponding to the third identifier in the target service scheduling sequence, the optimization of service allocation is realized, and the high-quality service and experience are provided for users.

Figure 3:
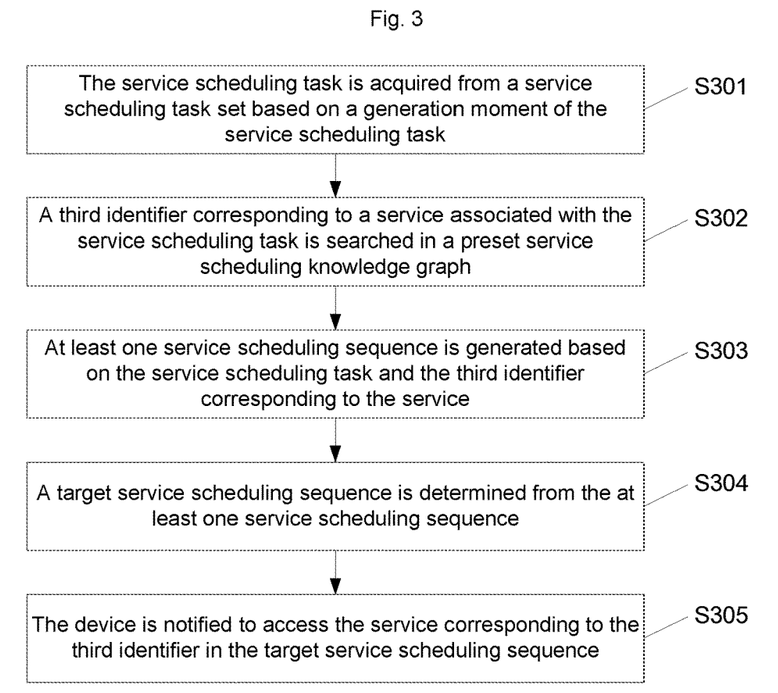
FIG. 3 is a schematic implementation flowchart of another service scheduling method according to some embodiments of the present disclosure.

FIG. 3 is another schematic implementation flowchart of a service scheduling method according to some embodiments of the present disclosure. In some embodiments, the method specifically include the following steps.

At S301, the service scheduling task is acquired from a service scheduling task set based on a generation moment of the service scheduling task, and the service scheduling task is composed of the first identifier corresponding to the service request and the second identifier corresponding to the device receiving the service request.

In some embodiments of the present disclosure, for a plurality of service scheduling tasks in the service scheduling task set, the service scheduling task is acquired from the service scheduling task set based on the generation moment of the service scheduling task.

In some embodiments, the generation moment of the certain service scheduling task is same as a generation moment of other service scheduling tasks, or is different from the generation moment of other service scheduling tasks, which is not limited thereto in some embodiments of the present disclosure.

For example, the plurality of service scheduling tasks are concurrently generated at a certain moment. In some embodiments of the present disclosure, the plurality of service scheduling tasks are acquired from the service scheduling task set based on the generation moment of the service scheduling task.

At S302, a third identifier corresponding to a service associated with the service scheduling task is searched in a preset service scheduling knowledge graph.

In some embodiments of the present disclosure, this step is similar to step S102, which is not described again in some embodiments of the present disclosure.

At S303, at least one service scheduling sequence is generated based on the service scheduling task and the third identifier corresponding to the service.

In some embodiments of the present disclosure, this step is similar to step S103, which is not described again in some embodiments of the present disclosure.

At S304, a target service scheduling sequence is determined from the at least one service scheduling sequence.

In some embodiments of the present disclosure, the calculation, for the at least one service scheduling sequence generated in the above step, of the scheduling value corresponding to the at least one service scheduling sequence means that each service scheduling sequence corresponds to one scheduling value, that is, one-to-one correspondence.

In some embodiments, the target service scheduling sequence is determined from the at least one service scheduling sequence based on the above calculated scheduling value.

For example, for the above generated service scheduling sequence 1 and the service scheduling sequence 2, a scheduling value D1 corresponding to the service scheduling sequence 1 is calculated, a scheduling value D2 corresponding to the service scheduling sequence 2 is calculated, as shown in Table 3 below.

TABLE 3

| Service scheduling sequence | Scheduling value |
| --- | --- |
| 1 | D1 |
| 2 | D2 |

In some embodiments, the target service scheduling sequence is determined from the service scheduling sequence 1 and the service scheduling sequence 2 based on the scheduling value D1 corresponding to the service scheduling sequence 1 and the scheduling value D2 corresponding to the service scheduling sequence 2, as shown in Table 3.

An optional implementation of calculating the scheduling value corresponding to the at least one service scheduling sequence includes the following operation.

An importance degree of the service request corresponding to the first identifier, a utilization rate of the device corresponding to the second identifier, and an occupancy of the service corresponding to the third identifier in the at least one service scheduling sequence are acquired. The importance degree, the utilization rate, and the occupancy are inputted into a scheduling value calculation model which is preset, to cause the scheduling value calculation model to output the scheduling value.

The importance degree of the service request is determined by the number of times that the service request is triggered. When the device receives the service request, it is recorded as a trigger. For example, the importance degree range from 0 to 1, and the larger the value, the higher the importance degree.

In some embodiments, the utilization rate of the device is obtained by dividing the number of service requests currently received by a total number of service requests allowed to be received. For example, the number of the service requests that the device currently receives is 50, the total number of the service requests allowed to be received is 100, and then the utilization rate of the device is 50%.

In some embodiments, the occupancy of the service is obtained by dividing the number of devices currently accessing the service by a total number of devices allowed to access the service. For example, the number of the devices currently accessing the service is 50, the total number of the devices allowed to access the service is 100, and then the occupancy of the service is 50%.

For example, by using the service scheduling sequence 1 as an example, in some embodiments of the present disclosure, an importance degree of the service request 1 corresponding to the first identifier, a utilization rate of the device 1 corresponding to the second identifier, and an occupancy of the service 1 corresponding to the third identifier in the service scheduling sequence 1 are acquired.

The above acquired the importance degree of the service request 1 corresponding to the first identifier, the utilization rate of the device 1 corresponding to the second identifier, and the occupancy of the service 1 corresponding to the third identifier are inputted into a preset scheduling value calculation model, to cause the scheduling value calculation model to output the scheduling value D1 corresponding to the service scheduling sequence 1.

In some embodiments, the scheduling value calculation model is shown as follows.

$$DV=I*A+F*B+U*C;$$

DV is the scheduling value, I is the importance degree, F is the utilization rate, U is the occupancy, A is a weight corresponding to the importance degree, B is a weight corresponding to the utilization rate, and C is a weight corresponding to the occupancy.

It is to be noted that, in some embodiments, the weight corresponding to the importance degree, the weight corresponding to the utilization rate, and the weight corresponding to the occupancy is e set according to actual requirements, which are not limited thereto in some embodiments of the present disclosure.

An optional implementation of determining the target service scheduling sequence from the at least one service scheduling sequence based on the scheduling value includes the following operation.

A difference value between the scheduling value and a preset scheduling value threshold is calculated. The target service scheduling sequence is determined from the at least one service scheduling sequence based on the difference value.

For example, in some embodiments of the present disclosure, an optimal scheduling value threshold is preset, and then the difference value between any scheduling value and the scheduling value threshold is calculated. By using the service scheduling sequence 1 as an example, for the scheduling value D1 corresponding to the service scheduling sequence 1, a difference value between the scheduling value D1 and the scheduling value threshold is calculated. The target service scheduling sequence is determined from the at least one service scheduling sequence based on the above calculated difference value.

In some embodiments, the difference value between the scheduling value and the preset scheduling value threshold is sorted, and then a service scheduling sequence corresponding to a minimum difference value is determined as the target service scheduling sequence from the at least one service scheduling sequence.

For example, for the scheduling value D1 corresponding to the service scheduling sequence 1, a difference value a between the scheduling value D1 and the scheduling value threshold is calculated. For the scheduling value D2 corresponding to the service scheduling sequence 2, a difference value b between the scheduling value D2 and the scheduling value threshold is calculated. The difference value a is compared with the difference value b. Assuming that the difference value a is less than the difference value b, the service scheduling sequence 1 corresponding to the difference value a is determined as the target service scheduling sequence.

At S305, the device is notified to access the service corresponding to the third identifier in the target service scheduling sequence.

In some embodiments of the present disclosure, this step is similar to step S105, which is not described again in some embodiments of the present disclosure.

Figure 4:
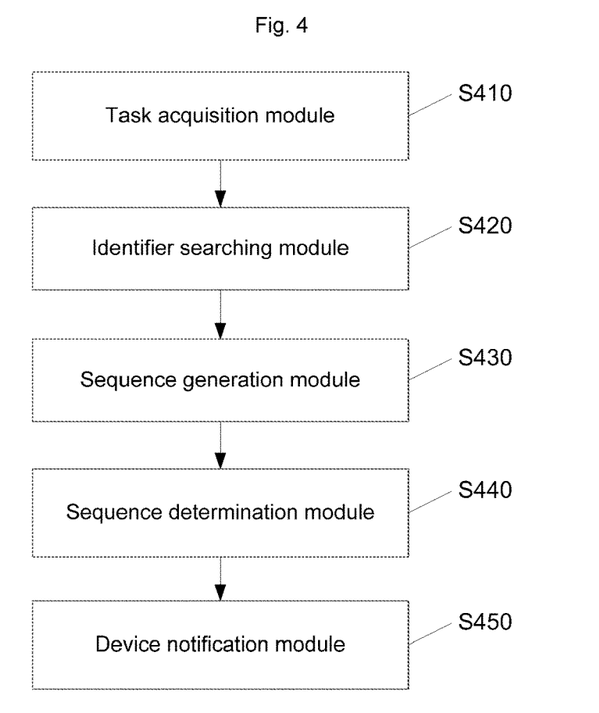
FIG. 4 is a schematic structural diagram of a service scheduling apparatus according to some embodiments of the present disclosure.

Corresponding to the above method embodiments, some embodiments of the present disclosure further provides an apparatus for service scheduling. In some embodiments, as shown in FIG. 4, the apparatus include a task acquisition module 410, an identifier searching module 420, a sequence generation module 430, a sequence determination module 440, and a device notification module 450.

The task acquisition module 410 is configured to obtain a service scheduling task, and the service scheduling task is composed of a first identifier corresponding to a service request and a second identifier corresponding to a device receiving the service request.

The identifier searching module 420 is configured to search for a third identifier corresponding to a service associated with the service scheduling task in a preset service scheduling knowledge graph.

The sequence generation module 430 is configured to generate at least one service scheduling sequence based on the service scheduling task and the third identifier corresponding to the service.

The sequence determination module 440 is configured to determine a target service scheduling sequence from the at least one service scheduling sequence.

The device notification module 450 is configured to notify the device to access the service corresponding to the third identifier in the target service scheduling sequence.

In a specific implementation of some embodiments of the present disclosure, the sequence determination module 440 includes a scheduling value calculation sub-module 441 and a sequence determination sub-module 442.

The scheduling value calculation sub-module 441 is configured to calculate a scheduling value corresponding to the at least one service scheduling sequence.

The sequence determination sub-module 442 is configured to determine the target service scheduling sequence from the at least one service scheduling sequence based on the scheduling value.

In a specific implementation of some embodiments of the present disclosure, the scheduling value calculation sub-module 441 is specifically configured to perform the following operations.

An importance degree of the service request corresponding to the first identifier, a utilization rate of the device corresponding to the second identifier, and an occupancy of the service corresponding to the third identifier in the at least one service scheduling sequence are acquired.

The importance degree, the utilization rate, and the occupancy are inputted into a scheduling value calculation model which is preset, to cause the scheduling value calculation model to output the scheduling value.

In a specific implementation of some embodiments of the present disclosure, the scheduling value calculation model includes the following.

$$DV=I*A+F*B+U*C.$$

DV is the scheduling value, I is the importance degree, F is the utilization rate, U is the occupancy, A is a weight corresponding to the importance degree, B is a weight corresponding to the utilization rate, and C is a weight corresponding to the occupancy.

In a specific implementation of some embodiments of the present disclosure, the sequence determination sub-module 442 includes a difference value calculation unit and a sequence determination unit.

The difference value calculation unit 4421 is configured to calculate a difference value between the scheduling value and a preset scheduling value threshold.

The sequence determination unit 4422 is configured to determine the target service scheduling sequence from the at least one service scheduling sequence based on the difference value.

In a specific implementation of some embodiments of the present disclosure, the sequence determination unit 4422 is specifically configured to perform the following operation.

A service scheduling sequence corresponding to a minimum difference value is determined as the target service scheduling sequence from the at least one service scheduling sequence.

In a specific implementation of some embodiments of the present disclosure, the task acquisition module 410 is specifically configured to perform the following operation.

The service scheduling task is acquired from a service scheduling task set based on a generation moment of the service scheduling task.

It is to be noted herein that, in some embodiments, the above task acquisition module 410, the identifier searching module 420, the sequence generation module 430, the sequence determination module 440, and the device notification module 450 is used as a part of the apparatus to be operated in a computer terminal. Functions implemented by the above modules are performed by a processor in the computer terminal. The terminal further be a smart phone (for example, an Android phone, an iOS phone, or the like), a tablet computer, a handheld computer, a Mobile Internet Device (MID), PAD, and other terminal devices.

Each functional unit provided in some embodiments of this disclosure is operated in a mobile terminal, a computer terminal, or a similar computing device, or is stored as a part of a storage medium.

Therefore, some embodiments of the present disclosure provide a computer terminal, and the computer terminal is any computer terminal device in a computer terminal group. Optionally, in some embodiments, the above computer terminal also be replaced by a terminal device such as a mobile terminal.

Optionally, in some embodiments, the above computer terminal is located in at least one network device among a plurality of network devices of a computer network.

In some embodiments, the computer terminal store program codes of the following steps in the service scheduling method, including: obtaining a service scheduling task, the service scheduling task consisting of a first identifier corresponding to a service request, and a second identifier corresponding to a device receiving the service request; searching for a third identifier corresponding to a service associated with the service scheduling task in a preset service scheduling knowledge graph; generating at least one service scheduling sequence based on the service scheduling task and the third identifier corresponding to the service; determining a target service scheduling sequence from the at least one service scheduling sequence; and notifying the device to access the service corresponding to the third identifier in the target service scheduling sequence.

Optionally, in some embodiments, the computer terminal include one or more processors, a memory, and a transmission apparatus.

In some embodiments, the memory is configured to store software programs and modules, such as a program instruction/module corresponding to the service scheduling method and apparatus in the embodiments of the present disclosure. The processor executes various function disclosures and data processing by operating the store software programs and modules stored in the memory, that is, the above service scheduling method is implemented. The memory include a high-speed random access memory, and further include a non-volatile memory, such as one or more magnetic disk memory apparatuses, a flash memory device, or other non-volatile solid-state memory devices. In some embodiments, the memory further include memories remotely disposed relative to the processor. The remote memories are connected to the terminal by using a network. Examples of the above network include, but are not limited to, the Internet, an intranet, a local area network, a mobile communication network, and a combination thereof.

The above transmission apparatus is configured to receive or transmit data via a network. Specific examples of the above network include a wired network and a wireless network. In an example, the transmission apparatus includes a Network Interface Controller (NIC), and is connected to a router by using a network cable or other network devices, so as to communicate with the Internet or a local area network. In an example, the transmission apparatus is a Radio Frequency (RF) module, which is configured to communicate with the Internet in a wireless manner.

Specifically, the memory is used for a disclosure program of cooking discharge. In some embodiments, the processor invoke information and disclosure programs stored in the memory by using the transmission apparatus to execute the program code of the method steps of each optional embodiment in the above method embodiments.

In some embodiments, those of ordinary skill in the art understand that the computer terminal also be a smart phone (such as an Android phone, an iOS phone, or the like), a tablet computer, a handheld computer, a Mobile Internet Device (MID), PAD, and other terminal devices.

In some embodiments, those of ordinary skill in the art understand that, all or part of the steps in the various methods of the above embodiments are completed by instructing hardware related to the terminal device through a program. The program is stored in a computer-readable storage medium, and the storage medium include a flash disk, a Read-Only Memory (ROM), a Random Access Memory (RAM), a magnetic disk, or an optical disk.

Figure 5:
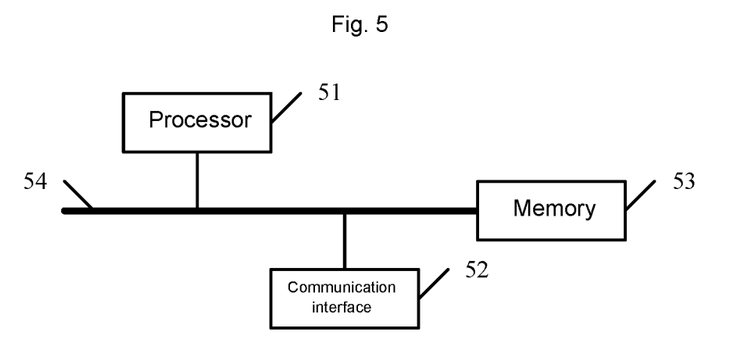
FIG. 5 is a schematic structural diagram of an electronic device according to some embodiments of the present disclosure.

Some embodiments of the present disclosure further provides an electronic device. As shown in FIG. 5, the electronic device includes a processor 51, a communication interface 52, a memory 53, and a communication bus 54. The processor 51, the communication interface 52, and the memory 53 communicate with each other by using the communication bus 54.

The memory 53 is configured to store a computer program.

The processor 51 is configured to implement the following steps when executing the program stored on the memory 53.

A service scheduling task is acquired, and the service scheduling task consists of a first identifier corresponding to a service request and a second identifier corresponding to a device receiving the service request. A third identifier corresponding to a service associated with the service scheduling task is searched in a preset service scheduling knowledge graph. At least one service scheduling sequence is generated based on the service scheduling task and the third identifier corresponding to the service. A target service scheduling sequence is determined from the at least one service scheduling sequence. The device is notified to access a service corresponding to the third identifier in the target service scheduling sequence.

In some embodiments, the communication bus mentioned in the above electronic device is a Peripheral Component Interconnect (PCI) bus or an Extended Industry Standard Architecture (EISA) bus, or the like. The communication bus is divided into an address bus, a data bus, a control bus, and the like. For ease of presentation, only one thick line is used in the figure, but it does not mean that there is only one bus or one type of buses.

The communication interface is configured to achieve communication between the electronic device and other devices.

In some embodiments, the memory include a Random Access Memory (RAM), or include a non-volatile memory (non-volatile memory), such as at least one disk memory. Optionally, the memory also be at least one storage apparatus located remotely from the foregoing processor.

In some embodiments, the above processor is a general processor, including a Central Processing Unit (CPU) and a Network Processor (NP), or is a Digital Signal Processor (DSP), an Application Specific Integrated Circuit (ASIC), a Field-Programmable Gate Array (FPGA) or other programmable logic devices, discrete gate or transistor logic devices, and discrete hardware components.

Still some embodiments of the present disclosure further provides a storage medium. The storage medium stores an instruction. When the instruction is operated on a computer, the computer executes the service scheduling method described in the above embodiments.

Still some embodiments of the present disclosure further provides a computer program product including an instruction. When the computer program product is operated on a computer, the computer executes the service scheduling method described in the above embodiments.

In the above embodiments, it is implemented in whole or in part by software, hardware, firmware, or any combination thereof. When the software is used for implementation, it is implemented in whole or in part in the form of the computer program product. The computer program product includes one or more computer instructions. When the above computer program instruction is loaded and executed on a computer, the above processes or functions according to the embodiments of the present disclosure are generated in whole or in part. The above computer is a general computer, a special computer, a computer network, or other programmable apparatus. The above computer instruction is stored in the storage medium or transmitted from one storage medium to another storage medium. For example, the above computer instruction is transmitted from a website site, a computer, a server, or a data center to another website site, another computer, another server, or another data center via wire (for example, a coaxial cable, an optical fiber, a Digital Subscriber Line (DSL)) or wireless (for example, infrared, wireless, microwave, or the like). The above storage medium is any available medium that is accessed by a computer, or a data storage device, such as a server and a data center, that includes one or more available mediums integrated. The above available medium is a magnetic medium (for example, a floppy disk, a hard disk, and a magnetic tape), an optical medium (for example, DVD), or a semiconductor medium (for example, Solid State Disk (SSD)), and the like.

It is also to be noted that relational terms such as first and second are used merely to distinguish one entity or operation from another entity or operation herein, and do not necessarily require or imply the existence of any such actual relationship or order between these entities or operations. Furthermore, terms "comprise", "include" or any other variants are intended to encompass non-exclusive inclusion, such that a process, a method, an article or a device including a series of elements not only include those elements, but also includes other elements not listed explicitly or includes intrinsic elements for the process, the method, the article, or the device. Without any further limitation, an element defined by the phrase "comprising one" does not exclude existence of other same elements in the process, the method, the article, or the device that includes the elements.

Each embodiment in this specification is described in a related manner, and reference is made to each other for the same and similar parts among the various embodiments, and each embodiment focuses on the differences from other embodiments. In particular, for the system embodiments, since the system embodiments are basically similar to the method embodiments, the description is relatively simple, and for related parts, refer to the partial descriptions of the method embodiments.

The above descriptions are merely some embodiments of the present disclosure, and are not intended to limit the protection scope of the present disclosure. Any modifications, equivalent replacements, improvements and the like made within the spirit and principle of the present disclosure all fall within the scope of protection of the present disclosure.

What is claimed is:

1. A method for scheduling a service, comprising:
   acquiring a service scheduling task, the service scheduling task is composed of a first identifier corresponding to a service request, and a second identifier corresponding to a device receiving the service request;
   searching for a third identifier corresponding to a service associated with the service scheduling task in a preset service scheduling knowledge graph, the preset service scheduling knowledge graph is a knowledge graph which is pre-established according to an association relationship among the first identifier corresponding to the service request, the second identifier corresponding to the device, and the third identifier corresponding to the service;
   generating at least one service scheduling sequence based on the service scheduling task and the third identifier corresponding to the service;
   determining a target service scheduling sequence from the at least one service scheduling sequence; and
   notifying the device to access a service corresponding to the third identifier in the target service scheduling sequence, so as to the device receiving the service request access the service corresponding to the third identifier in the target service scheduling sequence,
   wherein determining the target service scheduling sequence from the at least one service scheduling sequence comprises:
   calculating a scheduling value corresponding to the at least one service scheduling sequence; and
   determining the target service scheduling sequence from the at least one service scheduling sequence based on the scheduling value,
   wherein calculating the scheduling value corresponding to the at least one service scheduling sequence comprises:
   acquiring an importance degree of the service request corresponding to the first identifier, a utilization rate of the device corresponding to the second identifier, and an occupancy of the service corresponding to the third identifier in the at least one service scheduling sequence;
   inputting the importance degree, the utilization rate, and the occupancy into a scheduling value calculation model which is preset. to cause the scheduling value calculation model to output the scheduling value, wherein the scheduling value calculation model comprises:

$$DV=I*A+F*B+U*C,$$

wherein DV is the scheduling value, I is the importance degree, F is the utilization rate, U is the occupancy, A is a weight corresponding to the importance degree, B is a weight corresponding to the utilization rate, and C is a weight corresponding to the occupancy, the method is applied to a processor of a smart home system, the smart home system comprises a plurality of Internet of Things devices, the device receiving the service request is one of the plurality of Internet of Things devices.

2. The method according to claim 1, wherein determining the target service scheduling sequence from the at least one service scheduling sequence based on the scheduling value comprises:

calculating a difference value between the scheduling value and a preset scheduling value threshold; and determining the target service scheduling sequence from the at least one service scheduling sequence based on the difference value, wherein there are a plurality of service scheduling sequences, and determining the target service scheduling sequence from the plurality of service scheduling sequences based on the difference value comprises:

determining a service scheduling sequence corresponding to a minimum difference value as the target service scheduling sequence from the plurality of service scheduling sequences, the minimum difference value is a minimum value among a plurality of the difference values.

3. The method according to claim 1, wherein acquiring the service scheduling task comprises:

acquiring the service scheduling task from a service scheduling task set based on a generation moment of the service scheduling task, the generation moment is a moment which is generating the service scheduling task according to the first identifier corresponding to the service request and the second identifier corresponding to the device receiving the service request.

4. An apparatus for scheduling a service, comprising:

a task acquisition module, configured to obtain a service scheduling task, the service scheduling task is composed of a first identifier corresponding to a service request, and a second identifier corresponding to a device receiving the service request;

an identifier searching module, configured to search for a third identifier corresponding to a service associated with the service scheduling task in a preset service scheduling knowledge graph, the preset service scheduling knowledge graph is a knowledge graph which is pre-established according to an association relationship among the first identifier corresponding to the service request, the second identifier corresponding to the device, and the third identifier corresponding to the service;

a sequence generation module, configured to generate at least one service scheduling sequence based on the service scheduling task and the third identifier corresponding to the service;

a sequence determination module, configured to determine a target service scheduling sequence from the at least one service scheduling sequence; and a device notification module, configured to notify the device to access a service corresponding to the third identifier in the target service scheduling sequence, so as to the device receiving the service request access the service corresponding to the third identifier in the target service scheduling sequence, the sequence determination module comprises a scheduling value calculation sub-module and a sequence determination sub-module, the scheduling value calculation sub-module is configured to calculate a scheduling value corresponding to the at least one service scheduling sequence, the sequence determination sub-module is configured to determine the target service scheduling sequence from the at least one service scheduling sequence based on the scheduling value, the scheduling value calculation sub-module is specifically configured to perform the following operations:

acquiring an importance degree of the service request corresponding to the first identifier. a utilization rate of the device corresponding to the second identifier, and an occupancy of the service corresponding to the third identifier in the at least one service scheduling sequence;

inputting the importance degree, the utilization rate, and the occupancy into a scheduling value calculation model which is preset, to cause the scheduling value calculation model to output the scheduling value, wherein the scheduling value calculation model comprises:

$$DV=I*A+F*B+U*C,$$

wherein DV is the scheduling value, I is the importance degree, F is the utilization rate, U is the occupancy, A is a weight corresponding to the importance degree, B is a weight corresponding to the utilization rate, and C is a weight corresponding to the occupancy, a processor of a smart home system comprises the apparatus, the smart home system comprises a plurality of Internet of Things devices, the device receiving the service request is one of the plurality of Internet of Things devices.

5. An electronic device, comprising a processor, a communication interface, a memory, and a communication bus, wherein the processor, the communication interface, and the memory communicate with each other by using the communication bus;

the memory is configured to store a computer program; and when executing the program stored on the memory, the processor is configured to implement steps of a method for scheduling a service comprises:

acquiring a service scheduling task, the service scheduling task is composed of a first identifier corresponding to a service request, and a second identifier corresponding to a device receiving the service request;

searching for a third identifier corresponding to a service associated with the service scheduling task in a preset service scheduling knowledge graph, the preset service scheduling knowledge graph is a knowledge graph which is pre-established according to an association relationship among the first identifier corresponding to the service request, the second identifier corresponding to the device, and the third identifier corresponding to the service;

generating at least one service scheduling sequence based on the service scheduling task and the third identifier corresponding to the service;

determining a target service scheduling sequence from the at least one service scheduling sequence; and notifying the device to access a service corresponding to the third identifier in the target service scheduling sequence, so as to the device receiving the service request access the service corresponding to the third identifier in the target service scheduling sequence, wherein determining the target service scheduling sequence from the at least one service scheduling sequence comprises:
   calculating a scheduling value corresponding to the at least one service scheduling sequence; and
   determining the target service scheduling sequence from the at least one service scheduling sequence based on the scheduling value, wherein calculating the scheduling value corresponding to the at least one service scheduling sequence comprises:
   acquiring an importance degree of the service request corresponding to the first identifier, a utilization rate of the device corresponding to the second identifier, and an occupancy of the service corresponding to the third identifier in the at least one service scheduling sequence; and
   inputting the importance degree, the utilization rate, and the occupancy into a scheduling value calculation model which is preset, to cause the scheduling value calculation model to output the scheduling value, wherein the scheduling value calculation model comprises:

$$DV=I*A+F*B+U*C,$$

wherein DV is the scheduling value, I is the importance degree, F is the utilization rate, U is the occupancy, A is a weight corresponding to the importance degree, B is a weight corresponding to the utilization rate, and C is a weight corresponding to the occupancy an electronic device is a smart home system, the smart home system comprises a plurality of Internet of Things devices, the device receiving the service request is one of the plurality of Internet of Things devices.

6. The electronic device according to claim 5, wherein determining the target service scheduling sequence from the at least one service scheduling sequence based on the scheduling value comprises:
   calculating a difference value between the scheduling value and a preset scheduling value threshold; and
determining the target service scheduling sequence from the at least one service scheduling sequence based on the difference value, wherein there are a plurality of service scheduling sequences, and determining the target service scheduling sequence from the plurality of service scheduling sequences based on the difference value comprises:
determining a service scheduling sequence corresponding to a minimum difference value as the target service scheduling sequence from the plurality of service scheduling sequences, the minimum difference value is a minimum value among a plurality of the difference values.

7. The electronic device according to claim 5, wherein acquiring the service scheduling task comprises:
   acquiring the service scheduling task from a service scheduling task set based on a generation moment of the service scheduling task,
   the generation moment is a moment which is generating the service scheduling task according to the first identifier corresponding to the service request and the second identifier corresponding to the device receiving the service request.

* * * * *